(12) United States Patent
Peterson et al.

(10) Patent No.: US 9,798,673 B2
(45) Date of Patent: Oct. 24, 2017

(54) PAGING ENABLEMENT OF STORAGE TRANSLATION METADATA

(71) Applicant: SanDisk Technologies LLC, Plano, TX (US)

(72) Inventors: James G. Peterson, San Jose, CA (US); Igor Sharovar, Salt Lake City, UT (US); David Atkisson, Draper, UT (US)

(73) Assignee: SanDisk Technologies LLC, Plano, TX (US)

( * ) Notice: Subject to any disclaimer, the term of this patent is extended or adjusted under 35 U.S.C. 154(b) by 39 days.

(21) Appl. No.: 13/831,392

(22) Filed: Mar. 14, 2013

(65) Prior Publication Data

US 2014/0281333 A1    Sep. 18, 2014

(51) Int. Cl.
G06F 12/10       (2016.01)
G06F 12/1009    (2016.01)
G06F 12/06       (2006.01)

(52) U.S. Cl.
CPC ...... *G06F 12/1009* (2013.01); *G06F 12/0638* (2013.01); *G06F 2212/1004* (2013.01); *G06F 2212/2022* (2013.01)

(58) Field of Classification Search
None
See application file for complete search history.

(56) References Cited

U.S. PATENT DOCUMENTS

| 4,730,249 A * | 3/1988 | O'Quin et al. ............... 718/100 |
| 7,328,307 B2 | 2/2008 | Hoogterp |
| 2013/0159662 A1* | 6/2013 | Iyigun et al. ................. 711/206 |

OTHER PUBLICATIONS

Microsoft, "Changing the Location of the Pagefile", Oct. 18, 2006, https://msdn.microsoft.com/en-us/library/ms912851%28v=winembedded.5%29.aspx.*
Aayush Gupta, Youngjae Kim, and Bhuvan Urgaonkar. 2009. DFTL: a flash translation layer employing demand-based selective caching of page-level address mappings. SIGARCH Comput. Archit. News 37, 1 (Mar. 2009), 229-240. http://doi.acm.org/10.1145/2528521.1508271.*

(Continued)

*Primary Examiner* — Reginald Bragdon
*Assistant Examiner* — Edward Wang
(74) *Attorney, Agent, or Firm* — Stoel Rives LLP

(57) ABSTRACT

Techniques are disclosed relating to storing translations in memory that are usable to access data on a recording medium. In one embodiment, a request is sent for a memory allocation within a non-pageable portion of a memory in a computer system. Responsive to the request, allocated memory is received. Translations usable to map logical addresses to physical addresses within a storage device are stored within the allocated memory. In some embodiments, the translations are usable to access an area within the storage device used to store pages evicted from the memory. In one embodiment, a size of the memory allocation is determined based on a size of the area. In another embodiment, a size of the memory allocation is determined based on a size of a partition including the area. In some embodiments, the storage device is a solid-state storage array.

24 Claims, 12 Drawing Sheets

(56) References Cited

OTHER PUBLICATIONS

William K. Josephson, Lars A. Bongo, Kai Li, and David Flynn. 2010. DFS: A file system for virtualized flash storage. Trans. Storage 6, 3, Article 14 (Sep. 2010), 25 pages. http://doi.acm.org/10.1145/1837915.1837922.*

Sehwan Lee, et al. "A Demand-Based FTL Scheme using Dualistic Approach on Data Blocks and Translation Blocks," 17th IEEE International Conference on Embedded and Real-Time Computing Systems and Applications, 2011, pp. 167-176.

* cited by examiner

PAGING ENABLEMENT OF STORAGE TRANSLATION METADATA

BACKGROUND

Technical Field

This disclosure relates generally to accessing data on a physical recording medium, and more specifically to storing translations in memory that are usable to access data on the physical recording medium.

Description of the Related Art

Modern computer systems may implement a memory-mapping scheme (referred to as a "virtual memory") in which a larger address space (referred to as a "virtual address space") is presented than what is actually available in main memory (e.g., random access memory (RAM)). In such a scheme, virtual addresses may map to either physical addresses within the main memory or addresses within persistent storage such as hard disk storage, non-volatile storage media, optical drive storage, etc. To process a request to access a particular memory location, a memory management unit (MMU) may receive a virtual memory address for the memory location and translate the virtual address to a corresponding physical address. The MMU may then reference the physical address to retrieve the desired data.

A virtual address space may be divided into blocks, which in some cases may be referred to as "pages." These blocks may reside in memory or a particular portion of the persistent storage (referred to as a "swap" file or "swap" partition in Linux or a "page file" in WINDOWS). The locations of pages may be managed by an operating system or a component of an operating system such as a virtual memory manager, that also maintains a mapping of virtual addresses to physical addresses in memory. This mapping may be referred to as a "page table" in some implementations. When a page is not present in memory, in one implementation, the page table does not include virtual address translations for that page (or the translations are no longer valid). If an MMU receives a request for data at a virtual address for that page, the MMU may signal a page fault exception in response to the page table not including a translation for the virtual address. The processor unit may invoke the operating system in response to the exception to cause the operating system to service the page fault (i.e., load the page from persistent storage to memory). The operating system may then update the page table to reflect the insertion of the page into memory. In some instances, moving a page into memory may necessitate removing (i.e., evicting) another page from memory to make space (this operation may be referred to as a "page out" or "page swap" operation.) This evicted page may be stored in persistent storage until it is requested again.

SUMMARY

The present disclosure describes embodiments in which a map structure is used to access data in a storage device. In various embodiments, the map structure includes translations of logical addresses (e.g., logical block addresses (LBAs)) to physical addresses within the storage device (which, in some embodiments, is a solid-state storage). In various embodiments, a portion of the map structure is maintained within memory (e.g., RAM) to facilitate performance of read and write operations to the storage device. In one embodiment, the portion includes translations that are usable to access a swap space (e.g. a file or partition) within the storage device. In some embodiments, these translations are stored within a memory allocation having pages that cannot be evicted from the memory. In one embodiment, the size of the memory allocation is determined based on a size of the swap space. In another embodiment, the size of the memory allocation is determined based on a size of a partition including the swap space.

In one embodiment, a method is disclosed. The method includes sending a request for a memory allocation within a non-pageable portion of a memory in a computer system. The method further includes receiving allocated memory responsive to the request and storing, within the allocated memory, translations usable to map logical addresses to physical addresses within a storage device. In such an embodiment, the stored translations are usable to access a swap portion of the storage device, the swap portion being used to store pages evicted from the memory.

In another embodiment, an apparatus that includes a management module and a translation module is disclosed. The management module is configured to cause address translations of a map data structure to be stored within a dedicated portion of memory. The dedicated portion is used to store address translations that map logical addresses to physical addresses within a storage device used to store pages evicted from the memory. The translation module is configured to use one or more of the stored address translations to facilitate accesses to the physical addresses.

In still another embodiment, a non-transitory computer readable medium having program instructions stored thereon is disclosed. The program instructions are executable by a computing system to cause the computing system to perform operations. The operations include loading a set of translations into one or more pages within a memory. The set of translations are usable to access a swap portion of a storage device usable to store pages evicted from the memory. The operations further include indicating to a virtual memory manager of the computer system that the one or more pages are not to be evicted from the memory to the storage device.

In yet another embodiment, an apparatus including a first means, second means, and third means is disclosed. The first means is for requesting an allocation of a non-evictable portion of a memory within a computer system. The second means is for storing data using a log-structure. The third means is for loading, into the allocation of the non-evictable portion of memory, translations for accessing pages evicted from the memory to the second means.

Figure 1:
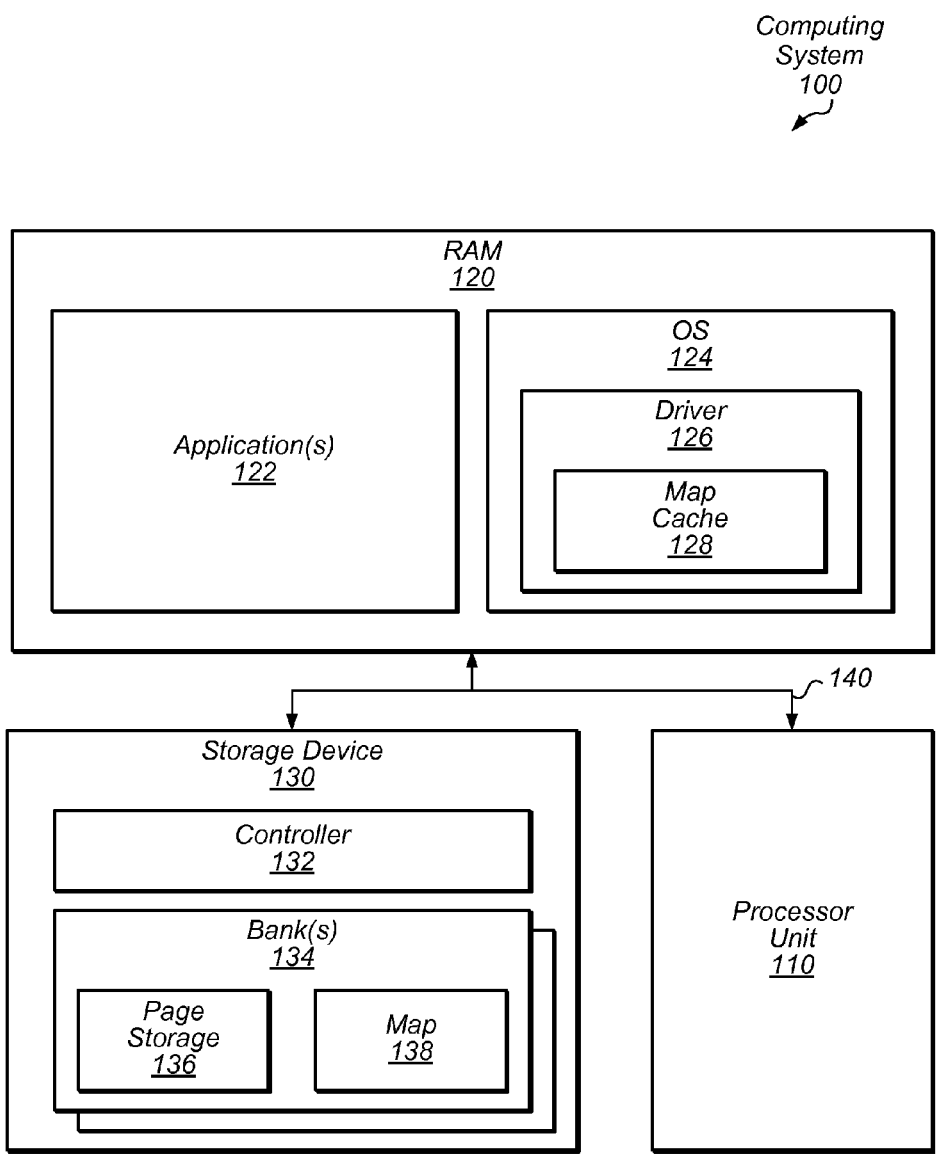
FIG. 1 is a block diagram illustrating one embodiment of a computing system that implements a virtual memory.

The disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

This disclosure also includes and references the accompanying drawings. In the drawings, similar symbols typically identify similar components, unless context dictates otherwise. The illustrative embodiments described in the detailed description, drawings, and claims are not meant to be limiting. Other embodiments may be utilized, and other changes may be made to these exemplary embodiments, without departing from the scope of the disclosure.

Various units, circuits, or other components in this disclosure may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

DETAILED DESCRIPTION

Figure 2:
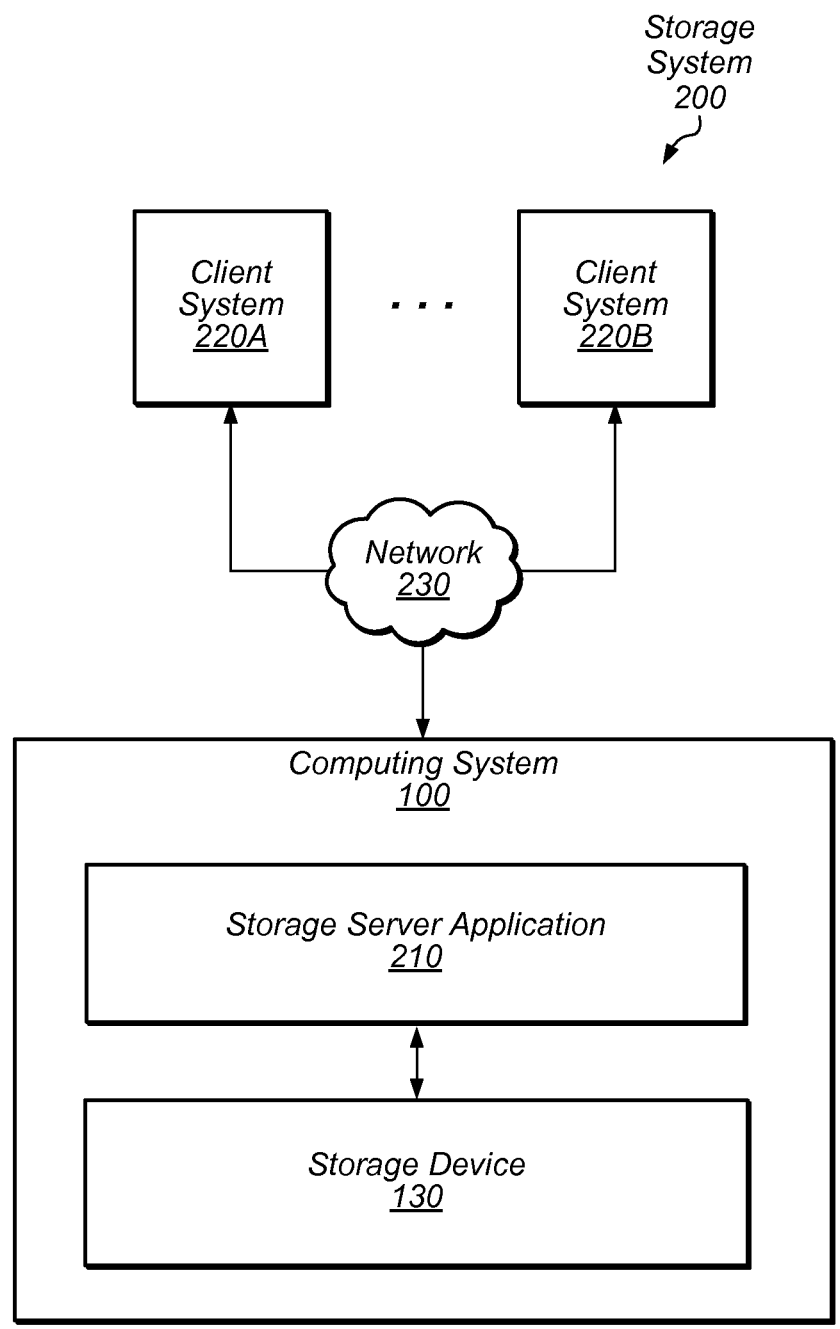
FIG. 2 is a block diagram illustrating one embodiment of a storage system that includes the computer system.

The disclosure initially describes, with reference to FIGS. 1 and 2, a computer system that implements a virtual memory. To facilitate this description, logical and physical address spaces used to implement one embodiment of a log-structured storage are described with reference to FIGS. 3A-3C. A map structure usable to access data within the storage device is described with reference to FIGS. 4A and 4B. Embodiments in which translations from the map data structure are stored within memory are then described in further detail with reference to FIGS. 5-9C.

Turning now to FIG. 1, a block diagram of computing system 100 is depicted. Computing system 100 may be any suitable type of computing device such as a server, laptop, desktop, a mobile device, etc. In some embodiments, computing system 100 may include multiple computing devices working together. For example, in one embodiment, computing system 100 may be multiple servers coupled together at a data center configured to store data on behalf of multiple clients, such as the storage system discussed below in conjunction with FIG. 2. In the illustrated embodiment, computing system 100 includes a processor unit 110, random access memory (RAM) 120, and storage device 130 coupled together via an interconnect 140. As shown, RAM 120 may include program instructions for one or more applications 122 and an operating system (OS) 124 executable by processor unit 110. In the illustrated embodiment, OS 124 includes a driver 126 for storage device 130, which, in turn, includes a controller 132 and one or more storage banks 134.

In various embodiments, driver 126 is described as having various functionality. This functionality may be implemented in software, hardware or a combination thereof. Further, such functionality may be implemented by software outside of OS 124—e.g., as an application 122, in one embodiment. In another embodiment, this functionality may be implemented by software stored within a memory of controller 132 and executed by a processor of controller 132. In still another embodiment, controller 132 may include dedicated circuitry to implement functionality of driver 126. In sum, the depiction of driver 126 as being implemented in software within OS 124 should not be seen as limiting, but rather as a depiction of an exemplary embodiment.

Storage device 130 is representative of any physical medium upon which data can be recorded. As used herein, the term "recorded" refers broadly to the process of an electronic computing device storing, writing or otherwise transferring one or more data values on to some physical recording medium for subsequent use. Accordingly, a "physical recording medium" is used herein to refer to any medium on which data may be recorded by an electronic computing device. Further, the terms "storage" and "memory" are used herein to be synonymous with "physical recording medium." Given this broad definition, the designations memory (when referring to memory 120) and storage (when referring to storage device 130) in FIG. 1 and elsewhere in this disclosure may refer to volatile and/or non-volatile media. Such media may also be referred to herein as "memory," and portions of such media may be referred to as "blocks," "cells," "storage blocks," "memory blocks," etc. Collectively, a group of these blocks may be referred to as a "storage array," "memory array," etc.

References in this disclosure to "accessing" data in storage device 130 refers to any type of transaction, including writing data to storage device 130 and/or reading data from storage device 130, as well as, TRIM operations, maintenance accesses, discovery accesses, load and store operations under memory semantics, and the like. Further, given the broad definitions of "storage" and "memory" referred to above, these accesses may be applicable to a storage device that has non-volatile memory and/or volatile components.

In some embodiments, storage device 130 may be implemented such that it includes non-volatile memory. Accordingly, in such an embodiment, storage banks 134 may include non-volatile storage devices such as hard disk drives (e.g., Integrated Drive Electronics (IDE) drives, Small Computer System Interface (SCSI) drives, Serial Attached SCSI (SAS) drives, Serial AT Attachment (SATA) drives, etc.), tape drives, writable optical drives (e.g., CD drives, DVD drives, Blu-Ray drives, etc.) etc.

In some embodiments, storage device 130 may be implemented such that it includes non-volatile solid-state memory. Accordingly, in such an embodiment, storage banks 134 may include any suitable type of solid-state storage media including, but not limited to, NAND flash memory, NOR flash memory, nano RAM ("NRAM"), magneto-resistive RAM ("MRAM"), phase change RAM ("PRAM"), Racetrack memory, Memristor memory, nanocrystal wire-based memory, silicon-oxide based sub-10 nanometer process memory, graphene memory, Silicon-Oxide-Nitride-Oxide-Silicon ("SONOS"), Resistive random-access memory ("RRAM"), programmable metallization cell ("PMC"), conductive-bridging RAM ("CBRAM"), etc. In some embodiments, storage banks 134 may include multiple, different types of solid-state storage media.

In other embodiments, storage device 130 may be implemented such that it includes volatile memory. Storage banks 134 may thus correspond to any suitable volatile memory including, but not limited to such as RAM, dynamic RAM (DRAM), static RAM (SRAM), synchronous dynamic RAM (SDRAM), etc. Although shown independently of processor unit 110, in some embodiments, storage device 130 may correspond to memory within processor unit 110 such as one or more cache levels (e.g., L1, L2, L3, etc.) within processor unit 110.

In sum, various functionality will be described herein pertaining to storage device 130. Such functionality may be applicable to any suitable form of memory including both non-volatile and volatile forms. Thus, while particular embodiments of driver 126 are described herein within the context of non-volatile solid-state memory arrays, driver 126 may also be applicable to other recording media such as volatile memories and other types of non-volatile memories, particularly those that include a reclamation process.

Controller 132, in one embodiment, is configured to manage operation of storage device 130. Accordingly, controller 132 may facilitate performance of read operations at specified addresses (e.g., "physical addresses" as discussed below) including selecting the appropriate banks 134 and accessing the data within the appropriate cells within those banks. Controller 132 may facilitate performance of write operations including programming of particular cells. Controller 132 may also perform preparation operations to permit subsequent writes to storage device 130 such as, in one embodiment, erasing blocks of cells for subsequent reuse. (The cycle of programming and erasing a block of cells may be referred to as a "PE cycle.") In some embodiments, controller 132 implements separate read and write data pipelines to perform read and write operations in parallel. In one embodiment, controller 132 is also configured to communicate with driver 126 (discussed below) over interconnect 140. For example, in some embodiments, controller 132 communicates information for read and write operations via direct memory access (DMA) transactions coordinated by a DMA controller. Accordingly, controller 132 may support any suitable interconnect type such as a peripheral component interconnect (PCI), PCI express (PCI-e), serial advanced technology attachment ("serial ATA" or "SATA"), parallel ATA ("PATA"), small computer system interface ("SCSI"), IEEE 1394 ("FireWire"), Fiber Channel, universal serial bus ("USB"), etc. In some embodiments, controller 132 may also perform other operations such as error checking, data compression, encryption and decryption, packet assembly and disassembly, etc.

In various embodiments, storage device 130 is organized as a log-structured storage. As used herein, the term "log structure" refers to an arrangement of data on a storage medium in which an append point is used to determine where data is stored; the append point is advanced sequentially through an "address space" as data is stored. A log-structured storage is simply a storage device that is organized using a log structure. The use of a log structure also connotes that metadata is stored in conjunction with the data in order to permit the storage device 130 to be restored to a previous state (i.e., a "log checkpoint"). Such a restoration may be performed, for example, to facilitate crash recovery in the event of power loss, to recover a last known valid state in the event of data corruption, etc. As used herein, the term "address space" refers to a range of addresses that can be used to specify data within a storage device. As will be described below, a log-structured storage may have both logical and physical address spaces. The term "logical address space" refers to an address space as perceived by higher-level processes even though this address space may not be representative of how data is actually organized on the physical media of storage device 130 or the actual number of physical address locations actually in use, reserved, or allocated to a higher-level process. In contrast, the term "physical address space" refers to the address space used by lower-level processes and may be indicative of how data is organized on the physical media of storage device 130 and the actual number of physical address locations in use by a higher-level process. Embodiments of logical and physical address spaces are discussed in further detail in conjunction with FIGS. 3A and 3B, respectively. One embodiment of a log structure is discussed in conjunction with FIG. 3C.

In various embodiments, using a log structure may permit multiple instances of a set of data to be present in storage device 130 as the data is written, modified, and rewritten to storage. As part of tracking data in a physical address space, older instances of stored data (i.e., those instances that are not the current instance) may be indicated as invalid. For example, in one embodiment, when a value is to be updated, the value may be written at a storage block specified by the current append point (rather than at the location where the value was previously stored). In response to the write being successfully performed, any previously stored instances of that value may be marked as invalid. As used herein, the term "invalid" refers to data that no longer needs to be stored by the system (e.g., because a newer copy of the data exists later in the log). Similarly, the term "invalidating", in certain embodiments, refers to the marking of data as invalid (e.g., storing a record in a data structure, storing an indication elsewhere in the log indicating a physical address storing the data has invalid data, etc.). Invalidating may also refer to storing an instance of data (e.g., associated with a particular LBA) forward in the log, making any previous instances of the data invalid.

Map 138, in one embodiment, is used to map (i.e., translate) logical addresses to physical addresses within a storage device 130. Accordingly, as data becomes moved and invalidated, it may reside in different physical addresses on storage device 130 over time. Through the use of map 138, however, an application 122 may be able access a most recent set of data by specifying the same logical address (e.g., LBA) even though two or more versions of the data may reside in different physical addresses. Map 138 may be implemented using any suitable data structure. According, in one embodiment, map 138 is a binary-tree data structure. In others embodiments, map 138 may be an array, a linked list, a hash table, etc. In some embodiments, map 138 may be implemented using multiple data structures. In some embodiments, map 138 may be one of multiple maps 138. For example, in one embodiment, computing system 100 may include a map 138 specific for page storage 136 and a separate map 138 for mapping data of the remainder of storage device 130. One embodiment of map 138 is described in further detail below in conjunction with FIGS. 4A and 4B.

OS 124, in one embodiment, implements a file system to facilitate the retrieval of data by applications 122. Accordingly, in some instances, an application 122 may access data within storages 130 by specifying a corresponding file name to OS 124 via an application programming interface (API) request (in other instances, an application 122 may access data directly by specifying an address to be read from or written to). In response to receiving the request, OS 124 may access various file system information corresponding to directories and files (e.g., within a set of modes, file allocation tables, etc.) to determine one or more addresses where data for the file is stored.

In various embodiments, OS 124 facilitates management of a virtual memory (such as discussed above) for computing system 100. Accordingly, OS 124 may allocate portions of virtual memory (e.g., pages) to various ones of applications 122 in response to receiving allocation requests from those applications 122. OS 124 may also reclaim pages as applications 122 are terminated, no longer need the pages, etc. In various embodiments, OS 124 may maintain a page table within RAM 120 that is usable to map virtual addresses to corresponding physical addresses within RAM 120. For example, an application 122 may request data at a particular virtual address. In one embodiment, MMU within processor unit 110 may then access a translation for that virtual address within the page table (or a translation-look-aside buffer (TLB) within processor unit 110) to determine the physical address of the data within RAM 120. OS 124 may also service page faults (i.e., the condition in which a page needs to be loaded from storage device 130 into RAM 120). In one embodiment, processor unit 110 may invoke OS 124 to service a page fault in response to an exception raised by an MMU. In the illustrated embodiment, OS 124 manages page storage 136 to service page faults, including loading pages from page storage 136 and, in some instances, evicting pages to page storage 136. In other embodiments, virtual memory may be managed by other forms of virtual memory managers. For example, in one embodiment, virtual memory may be managed by a hypervisor of computer system. In another embodiment, virtual memory may be managed by guest operating systems operating in one or more virtual machines over a hypervisor.

Page storage 136, in one embodiment, stores pages that have been evicted by OS 124 until they are needed again. For example, in one embodiment in which OS 124 is a WINDOWS OS, page storage 136 is a page file. In another embodiment in which OS 124 is a Linux OS, page storage 136 is a swap or swap file. As used herein, the terms "page storage," "swap space," "swap file," and "swap portion" are used generally to refer to any persistent storage structure (e.g., page files, swaps, or otherwise) in which pages are placed after being evicted from memory. In some embodiments, page storage 136 may be located within the same partition (e.g., the same virtual storage unit as discussed below) on storage device 130 as OS 124. In other embodiments, page storage 136 and OS 124 are located in separate partitions. In some embodiments, computing system 100 may include multiple page storages 136—for example, in an embodiment in which computing system 100 executes multiple operating systems 124.

Driver 126, in one embodiment, is executable to permit applications 122 and OS 124 to interact with storage device 130. Accordingly, driver 126 may receive requests to perform read and write operations at specified logical block addresses and may issue corresponding commands to controller 132 to implement those operations. In some embodiments, driver 126 manages garbage collection for storage device 130 to reclaim storage blocks with invalid data. As used herein, "reclaiming" a storage block or "reclamation" of a storage block refers to preparing the storage block for reuse (i.e., so that the storage block can store new data). In the case of flash media, reclamation may include copying valid data out of the storage block and erasing the block.

In some embodiments, to facilitate performance of read and write operations, driver 126 also maps logical addresses (e.g., LBAs) to corresponding physical addresses (in other embodiments, mapping logical addresses to physical addresses may be performed elsewhere, such as at controller 132). Accordingly, driver 126 may also manage map 138 including adding and removing translations from map 138 as data is manipulated on storage device 130. In the illustrated embodiment, driver 126 stores a portion of map 138 (i.e., a subset of translations from map 138) in RAM 120 as map cache 128. (Although map cache 128 is shown as residing within driver 126 in the illustrated embodiment, map cache 128 may be located elsewhere in RAM 120, in other embodiments. In one embodiment, driver 126 may also store the entirety of map 138 in map cache 128 in some instances.) In some instances, storing translations in map cache 128 may allow them to be retrieved more quickly than retrieving them from map 138 in storage device 130. Map cache 128 may implement any suitable form of caching scheme. For example, in one embodiment, cache 128 may be implemented as a write-through cache such that modifying a translation in map cache 128 will result in a modification of the corresponding translation in map 138. In another embodiment, map cache 128 may be implemented as a write-back cache such that map 138 is updated when a translation is evicted from map cache 128. In various embodiments, driver 126 may issue requests to OS 124 for memory allocations in order to have sufficient space to store translations for map cache 128. In some embodiments, translations may be stored in map cache 128 in a different manner than they are stored in map 138. For example, in one embodiment, cache 128 may store translations from map 138 as a flat array, while map 138 may store translations in a tree structure.

In some embodiments, OS 124 may be implemented such that it will deny (or delay granting) memory allocation requests from driver 126 (as well as applications 122) while paging out (i.e., evicting) pages to page storage 136. In some instances, this can be problematic because the paging system (also referred to as a virtual memory manager) of OS 124 may use storage device 130 (which is managed by driver 126) as a bootable storage device. Accordingly, if OS 124 is attempting to access a portion of page storage 136 and driver 126 needs additional space to load the translations for accessing that portion, OS 124 may deny the memory allocation request for storing the translations, causing driver 126 to fail OS 124's request to access page storage 136. In some embodiments, causing a request from OS 124 to access page storage 136 to fail may cause OS 124 to crash. In some embodiments, an OS may not certify a driver 126 to manage page storage 136 unless the driver 126 guarantees against an OS 124 crash due to a lack of memory for the driver 126 managing page storage 136. Consequently, to make such a guarantee the driver 126 may have to preallocate all memory that could be needed. Such a solution may be impractical. Still further, in various embodiments, map 138 may be large enough that it is impractical to store map 138 entirely within RAM 120. For example, in one embodiment, map 138 may include 40-50 GB of translations per 1 TB of space within storage device 130.

In various embodiments, driver 126 may preallocate memory for map cache 128 in order to store certain translations in RAM 120, such as translations that might cause a crash of OS 124 if they cannot be loaded into RAM 120 as discussed above. As used herein, the term "preallocation" refers to the requesting of a memory allocation prior to needing to store data in the memory allocation. Accordingly, in one embodiment, driver 126 may send a memory allocation request for map cache 128 during booting of computing system 100. (As used here, "bootstrapping" or simply "booting" refers to the process of initializing a computer system during system startup. This process may include, for example, initializing main memory, performing hardware testing, loading an operating system, etc.) Driver 126, however, may not load translations into cache 128 until they are needed in order to facilitate performance of I/O operations, which may be after booting has completed. By preallocating memory for critical translations, driver 126, in some embodiments, enables computer system to support implementation of a virtual memory system in a stable fashion.

Driver 126 may determine the size of the allocation to be requested based on any of various criteria. (As used herein, the term "based on" is used to describe one or more factors that affect a determination. This term does not foreclose additional factors that may affect a determination. Thus, the phrase "determine A based on B" does not foreclose the determination of A from also being based on C.) In one embodiment discussed below with respect to FIG. 5, driver 126 requests one or more memory allocations that are sufficient to store translations for the entire address range (or address ranges) occupied by page storage 136. Translations usable to access a page storage may be referred to herein as "page storage translations;" translations usable to access portions other than a page storage may be referred to herein as "non-page storage translations." In some embodiments, driver 126 may determine the size of this address range (and thus the appropriate size of memory allocation for storing the translations) based on information specified by OS 124. In another embodiment discussed below with respect to FIG. 6, page storage 136 may be stored within a virtual storage unit (VSU); driver 126 requests one or more memory allocations that are sufficient to store translations for the entire address range (or address ranges) occupied by that VSU. As used herein, the term "virtual storage unit" refers to an allocated set of storage blocks (e.g., logical blocks discussed below) usable by one or more applications 122 and/or OS 124 to store application data. In some embodiments, a given VSU may be presented to applications 122 and/or OS 124 as a separate partition of storage device 130. In various embodiments, storage within storage device 130 may be divided among multiple VSUs. As noted above, page storage 136 may reside in the same partition (or VSU) as OS 124. In one embodiment, this partition may be a boot partition for computing system 100 (i.e., a partition that is initially accessed to facilitate booting the computer system).

In some embodiments, driver 126 stores certain translations (e.g., those associated with page storage 136) in a non-pageable portion of RAM 120. As used herein, a "non-pageable" or "non-evictable" memory portion is any portion of the memory (i.e., collection of pages within RAM 120) that will not be considered for possible eviction (e.g., by OS 124) to page storage 136 when servicing a page fault. Conversely, a "pageable" portion refers to any portion of memory that may be considered for eviction. Accordingly, in one embodiment, an application (such as driver 126 or applications 122) may establish a non-pageable portion by requesting that a specified set of pages be considered by the OS 124 as being part of that application's working set. As used herein, the term "working set" refers to a set of one or more pages that will not be considered for eviction to page storage 136 while that application has at least one executing process. Thus, in some embodiments, driver 126 may store certain translations within pages identified as being associated with driver 126's working set. In some embodiments, driver 126 may also store other translations (i.e., ones not associated with page storage 136) in a non-pageable portion of RAM 120. As will be discussed with respect to FIG. 4A, map 138 may be implemented as a tree structure. In such an embodiment, driver 126 may store translations for the root node and one or more additional node levels (e.g., the root node's children and grandchildren) as well as the pointers from those nodes (e.g., pointers 440 discussed below). In doing so, driver 126 may be able to traverse the tree structure more quickly as it may perform fewer accesses to storage device 130. In such an embodiment, driver 126 may limit the amount of non-page storage translations that can be stored in a non-pageable portion to prevent not having sufficient space for storing page storage translations; in another embodiment, driver 126 may not store address translations for addressing each page of page storage 136. In some embodiments, driver 126 may store certain other translations in a pageable portion of RAM 120 such that those transitions may be evicted and reloaded as needed by OS 124.

Turning now to FIG. 2, a block diagram of a storage system 200 including computing system 100 is depicted. As discussed above, computing system 100 may include one or more applications that operate on data stored in storage device 130. In the illustrated embodiment, computing system 100 executes a storage server application 210 to enable client systems 220A and 220B to access and store data in storage device 130 via network 230. For example, in one embodiment, storage system 200 may be associated within an enterprise environment in which server application 210 distributes enterprise data from storage device 130 to clients 220. In some embodiments, clients 220 may execute other server applications such as web servers, mail servers, virtual private network (VPN) servers, etc. to further distribute data to other computing systems. Accordingly, in some embodiments, storage server application 210 may implement various network attached storage (NAS) protocols such as the file transfer protocol (FTP), network file system (NFS) protocol, server message block (SMB) protocol, Apple file protocol (AFP), etc. In some embodiments, computing system 100 may be one of several computing systems 100 configured to implement a storage area network (SAN).

Figure 3A:
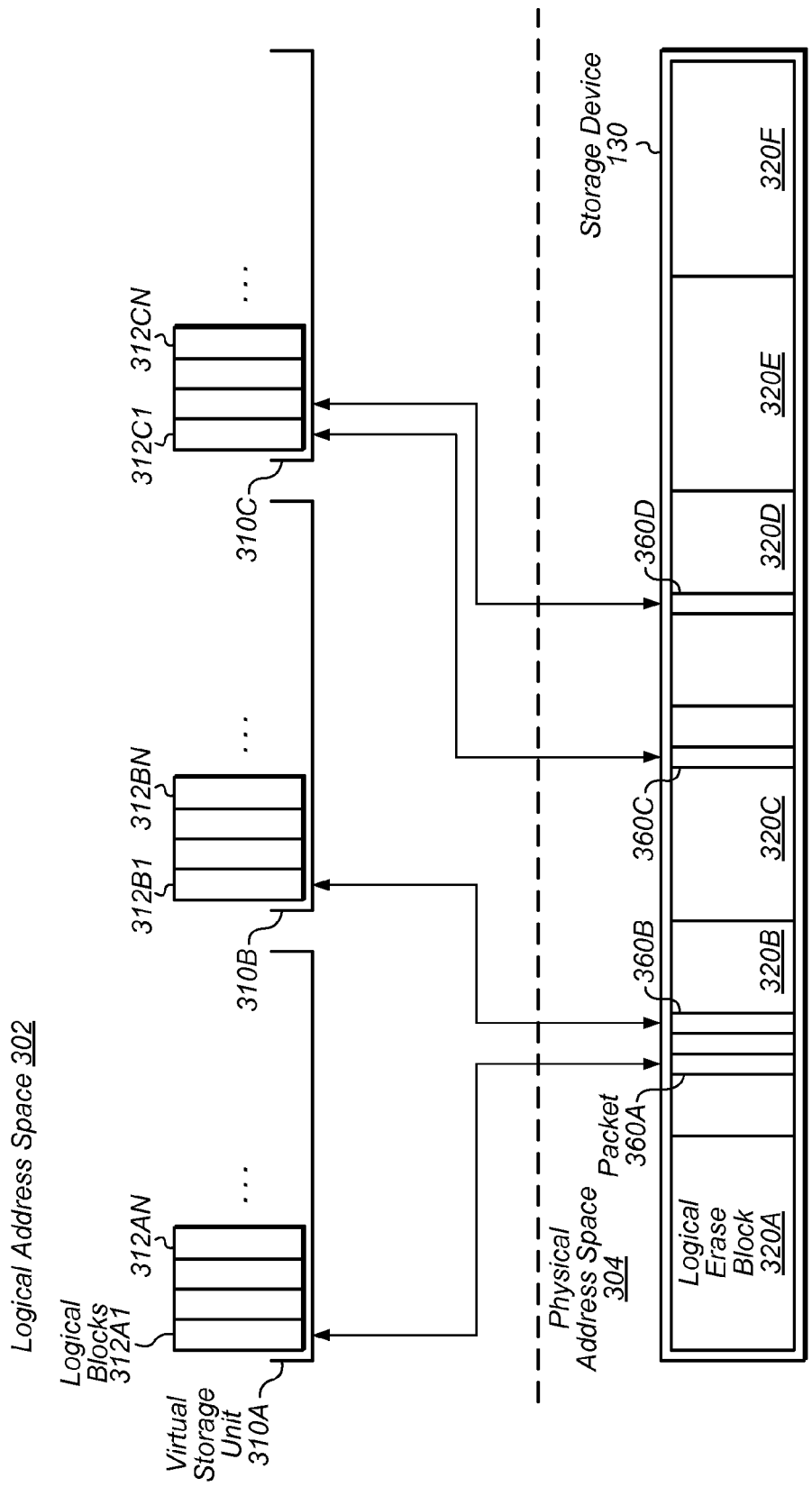
FIGS. 3A-3C are block diagrams illustrating embodiments of logical and physical address spaces.

Turning now to FIG. 3A, an exemplary mapping of a logical address space 302 to a physical address space 304 is depicted. In one embodiment, logical address space 302 represents the organization of data as perceived by higher-level processes such as applications 122 and OS 124. In one embodiment, physical address space 304 represents the organization of data on the physical media.

Logical address space 302, in one embodiment, is divided into logical addresses corresponding to respective logical blocks 312A1-312CN (also referred to as sectors 312). In some embodiments, the logical addresses are LBAs (in other embodiments, the logical addresses may correspond to some other form of logical identifiers). In one embodiment, sectors/blocks 312 represent the smallest block of data associated with a given logical address. As but one example, a block 312 may be approximately 512 bytes in size (while logical erase blocks and logical pages discussed below may be approximately 40 MB and 8 kB, respectively).

Physical address space 304, in one embodiment, is divided into physical addresses corresponding to the arrangement of data on the physical recoding media. As will be discussed in further detail with respect to FIG. 3B, in one embodiment, the content of logical blocks 312 may be stored as packets 360 within logical erase blocks 320. As discussed with respect to FIG. 3C, in various embodiments, physical address space 304 may be organized as a log structure, in which write operations may be performed at only one or more append points.

As shown, in some embodiments, logical blocks 312 may be allocated to a respective virtual storage unit 310 for storing data of that VSU 310. For example, in the illustrated embodiment, VSU 310A has been assigned a storage allocation of logical blocks 312A1-N, VSU 310B has been assigned an allocation of blocks 312B1-BN, and so on. In some embodiments, VSUs 310 may be implemented such they present a larger logical address space to applications 122 than the actual physical address space.

Figure 3B:
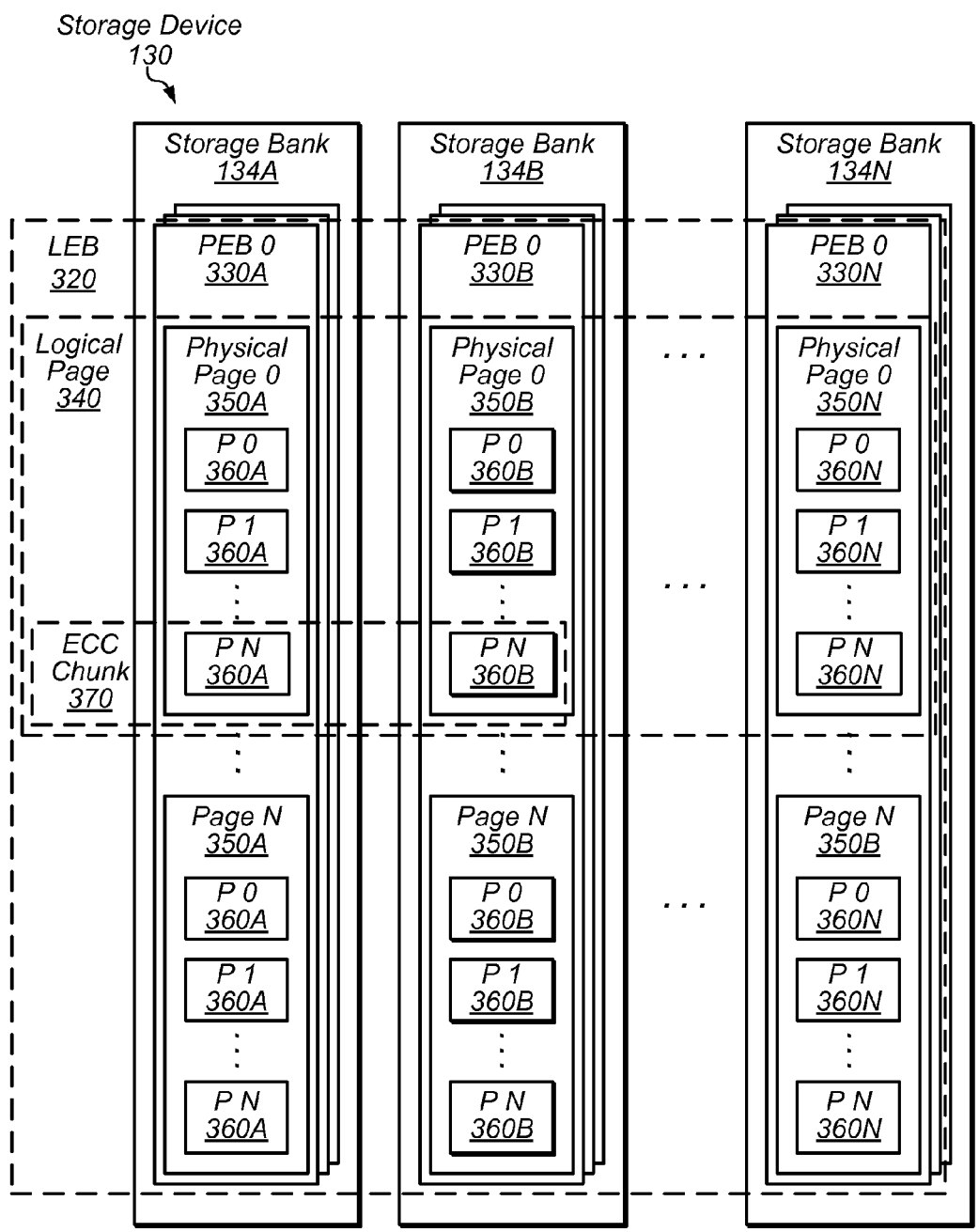

Turning now to FIG. 3B, a block diagram of storage blocks within storage device 130 is depicted. In the illustrated embodiment, storage device 130 is organized into logical erase blocks (LEBs) 320 that include multiple physical erase blocks (PEBs) 330, which are located in separate storage banks 134. A logical erase block 320 is further divided into multiple logical pages 340 (not to be confused with virtual memory pages discussed above) that, in turn, include multiple physical pages 350. Pages 350 include multiple packets 360, which may be grouped into ECC chunks 370.

As used herein, the term "erase block" refers broadly to a logical erase block or a physical erase block. In one embodiment, a physical erase block 330 represent the smallest storage block with a given bank 134 that can be erased at a given time (e.g., due to the wiring of cells on the die). In one embodiment, logical erase blocks 320 represent the smallest block erasable by controller 132 in response to receiving an erase command. In such an embodiment, when controller 132 receives an erase command specifying a particular logical erase block 320, controller 132 may erase each physical erase block 330 within the block 320 simultaneously. It is noted that physical erase blocks 330 within a given logical erase block 320 (e.g., blocks 330A and 330B) may be considered as contiguous in physical address space 304 even though they reside in separate banks 134. Thus, the term "contiguous" may be applicable not only to data stored within the same physical medium, but also to data stored within separate media.

In one embodiment, a physical page 350 represents the smallest storage block within a given bank 134 that can be written to at a given time. In one embodiment, a logical page 340 is the smallest writable storage block supported by controller 132. (In one embodiment, controller 132 may include a buffer configured to store up to a logical page worth of data; upon filling the buffer, controller 132 may write the contents of the buffer to a single logical page simultaneously.) In some instances, dividing a logical page 340 across multiple banks 134 may result in faster access times for a set of data when multiple banks 134 are accessed in parallel.

In one embodiment, a packet 360 represents the smallest storage block within a given bank 134 that can be read at a given time. In one embodiment, an ECC chunk 370 is the smallest storage block readable by controller 132. In some embodiments, packets 360 may be slightly larger than logical blocks 312 as they may include the contents of a logical block 312 (or multiple blocks 312 in some instances) as well as a packet header.

In some embodiments, driver 126 may associate metadata with one or more of storage blocks 320-370. As used herein, the term "metadata" refers to system data usable to facilitate operation of solid-state storage device 130; metadata stands in contrast to, for example, data produced by applications 122 (i.e., "application data") or forms of data would be considered by OS 124 as "user data." For example, in one embodiment, a logical erase block 320 may include metadata specifying, without limitation, usage statistics (e.g., the number of program erase cycles performed on that block 320), health statistics (e.g., a value indicative of how often corrupted data has been read from that block 320), security or access control parameters, sequence information (e.g., a sequence indicator), a persistent metadata flag (e.g., indicating inclusion in an atomic storage operation), a transaction identifier, or the like. In some embodiments, a logical erase block 320 includes metadata identifying the VSUs 310 for which it stores packets as well as the respective numbers of stored packet for each VSU 310. In one embodiment, the header within a packet 360 may include packet metadata such as one or more LBAs associated with the contained data, the packet size, linkages to other packets, error correction checksums, etc. In various embodiments, driver 126 may use this information, along with other forms of metadata, to manage operation of storage device 130. For example, driver 126 might use this information to facilitate performance of read and write operations, recover storage device 130 to a previous state (including, for example, reconstruction of various data structures used by driver and/or replaying a sequence of storage operations performed on storage device 130), etc.

Figure 3C:
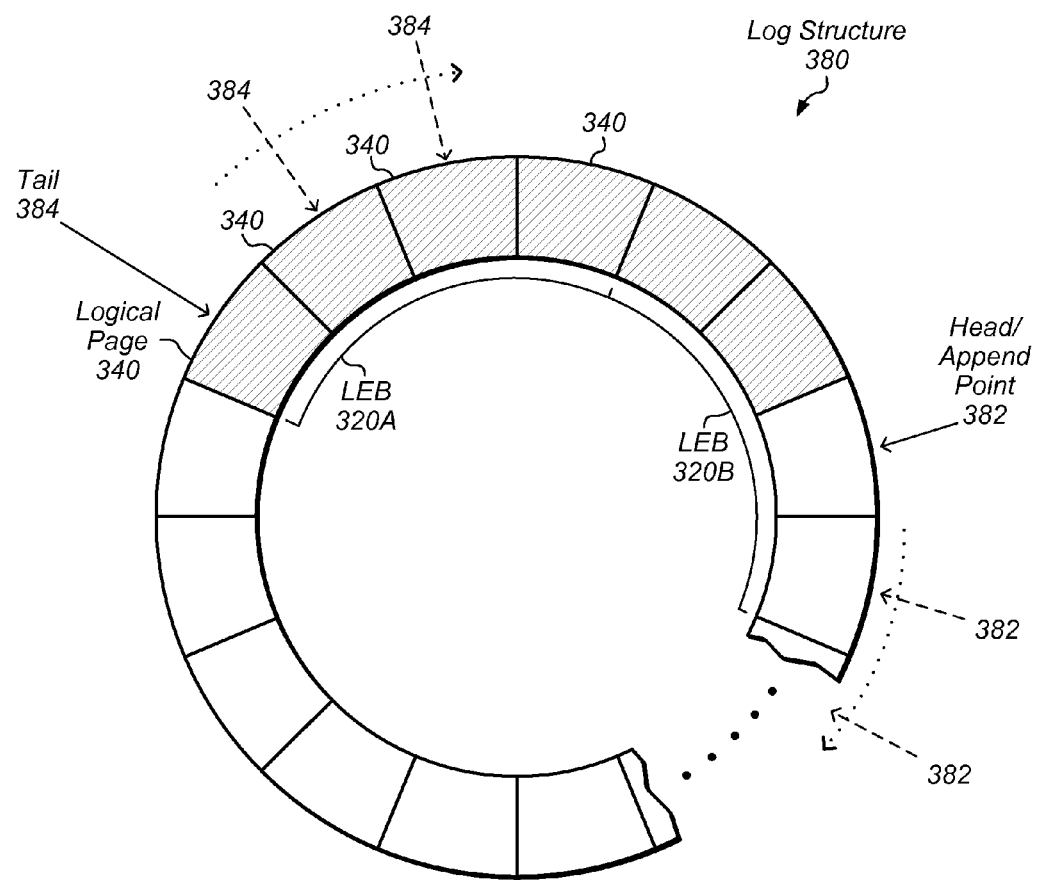

Turning now to FIG. 3C, a block diagram of log structure 380 within physical address space 304 is depicted. As shown, in various embodiments, data is stored sequentially at an append point 382 (also referred to as the "head") that starts an initial logical page 340. As additional data is stored, append point 382 advances to subsequent pages 340 in log structure 380. Eventually, after storing enough data, the append point 382 reaches the "last" page 340 in storage device 130, at which point the append point 382 wraps back to the initial page 340. Thus, log structure 380 is depicted as a loop/cycle. As more data is stored, the number of available pages 340 (shown as unshaded pages 340) decreases and the number of used pages 340 (shown as shaded pages 340) increases. As discussed above, in order to reuse these pages 340 (i.e., make them available to receive further writes), in one embodiment, driver 126 (using groomer 127) performs erase operations on logical erase blocks 320. In one embodiment, a tail 384 is maintained to identify the oldest page 340 still in use within structure 380 (pages other than the one located at the tail are considered to be younger than the tail). When the logical erase block 320 with the oldest page 340 is eventually erased, tail 384 is advanced forward to the next oldest page 340 in use at the end of log structure 380.

In general, data that is modified less frequently than other data in storage device 130 will migrate towards tail 384 (such data may be described as having a "colder temperature" or simply as "cold data"). On the other hand, data that is modified more frequently (described as having a "hotter temperature" or as "hot" data) will typically be located closer to head 382. Thus, valid data located in LEB 320A is likely "colder" than data in LEB 320B.

It is noted that, in other embodiments, storage device 130 may organized in a non-log-structured format.

Figure 4A:
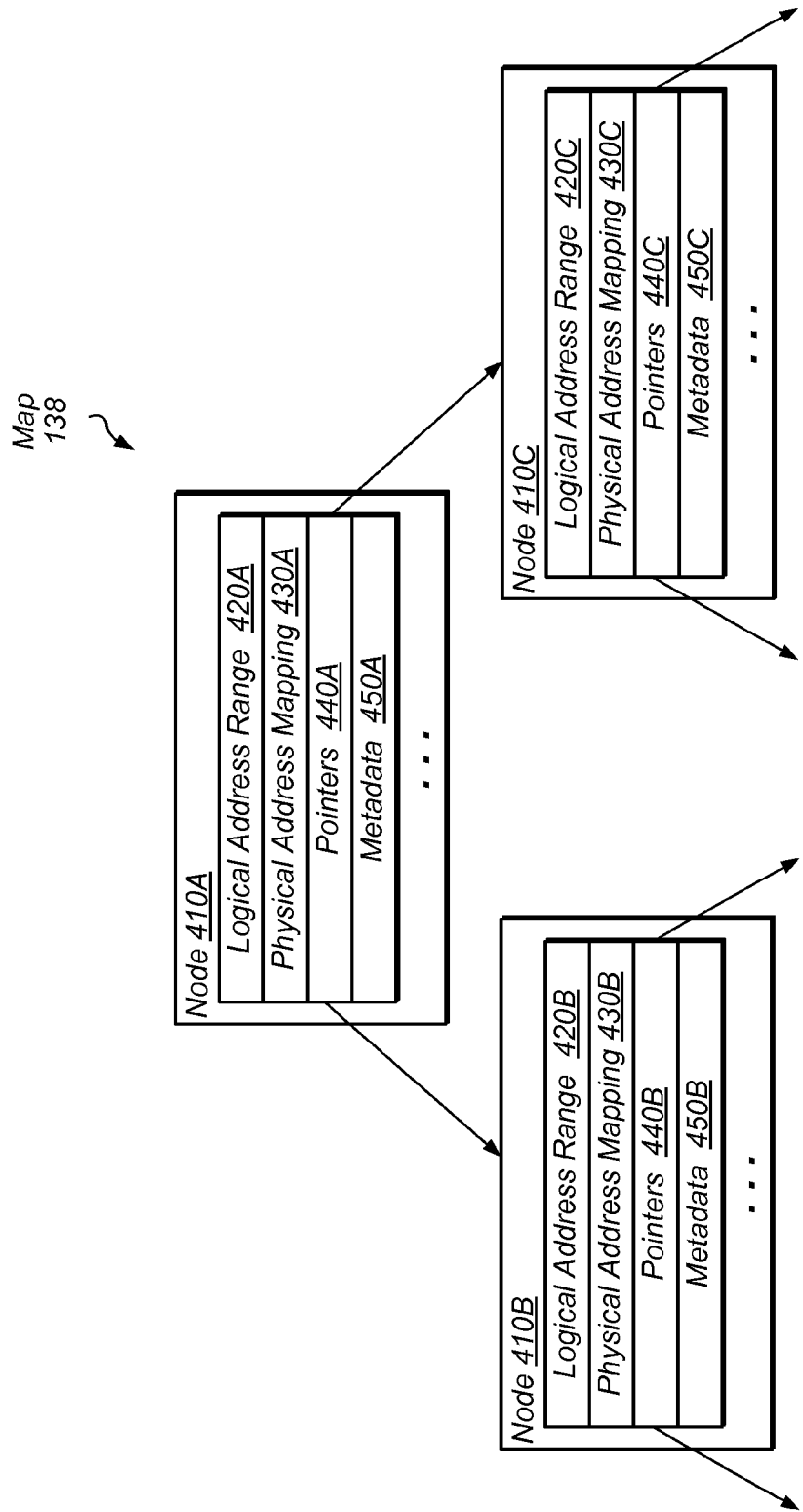
FIG. 4A is a block diagram illustrating one embodiment of a map data structure for translating a logical address to a corresponding physical address in a solid-state storage array.

Turning now to FIG. 4A, a block diagram of map 138 is depicted. In illustrated embodiment, map 138 is an extended-range b-tree that includes multiple nodes 410A-C. As shown, each node 410 includes a logical address range 420, a physical address mapping 430, one or more pointers 440, and additional metadata 450.

Logical address range 420, in one embodiment, is the range of logical addresses (e.g., LBAs) that are mapped using information within a given node 410. Accordingly, logical address range 420A specifies that physical address mapping 430A pertains to LBAs 50-100, for example. If a logical address does not "hit" in a node 410 (i.e., does not fall with in a range 420 of a node such as range 420A in root node 410A), then map 138 is traversed to examine ranges 420 in one or more leaf nodes such as nodes 410B or 410C. In one embodiment, map 138 includes a node 410 for each range of logical addresses that have been mapped to a corresponding range of physical addresses, but does not include nodes 410 corresponding to unmapped ranges. Thus, in such an embodiment, if a given LBA is unused, unallocated, and/or unwritten, a corresponding node 410 does not exist for that LBA in map 138. On the other hand, if an LBA has been written to, map 138 includes a node 410 specifying range 420 that includes the LBA. As such, nodes 410 may be added and/or modified when data is written to storage device 130. In such an embodiment, map 138 is also a sparse data structure, meaning that map 138 does not include mappings for an entire logical address space. Accordingly, in some embodiments, logical address space 302 may be significantly larger than physical address space 304.

Physical address mapping 430, in one embodiment, is the mapped physical addresses for a given range 420. In one embodiment, a given physical address is a composite a bank identifier for a storage bank 134, a PEB identifier for a PEB 330, a physical page identifier for a page 350, and a packet identifier for a packet 360; however in other embodiments, a physical address may be organized differently (e.g., a composite of LEB, logical-page, and ECC-chuck identifiers). In one embodiment, physical address mapping 430 is specified as a range of physical addresses. In another embodiment, physical address mapping 430 is a base address that is combined with an offset determined from the logical address. In other embodiments, mapping 430 may be specified differently.

Pointers 440, in one embodiment, identify leaf nodes 410 for a given node 410. In some embodiments, map 138 is organized such that a left pointer identifies a node 410 that has a lower address range 420 than the present node 410 and a right pointer may identify a node 410 having a higher address range 420. For example, if node 410A corresponds to the logical address range 50-100, node 410B may correspond to the range 0-50 and node 410C may correspond to the range 100-150. In some embodiments, map 138 may also be periodically balanced to give it a logarithmic access time.

Metadata 450, in one embodiment, is additional metadata that may not be used in mapping a logical address to physical address such as validity information and packet size. In one embodiment, validity information may identify whether particular locations (e.g., erase blocks, pages, or packets) store valid or invalid data. In some embodiments, metadata 450 may also include TRIM notes indicative of data that was invalidated in response to TRIM commands (in other embodiments, TRIM notes may be stored in a separate data structure within RAM 120, or on storage device 130). In some embodiments, storage device 130 may support variable packet sizes; in such an embodiment, metadata 450 may specify the size packets used for a given logical address range 420. In some embodiments, metadata 450 may also include other information such as age information, usage information (e.g., whether particular logical addresses are associated with hot or cold data), etc.

Figure 4B:
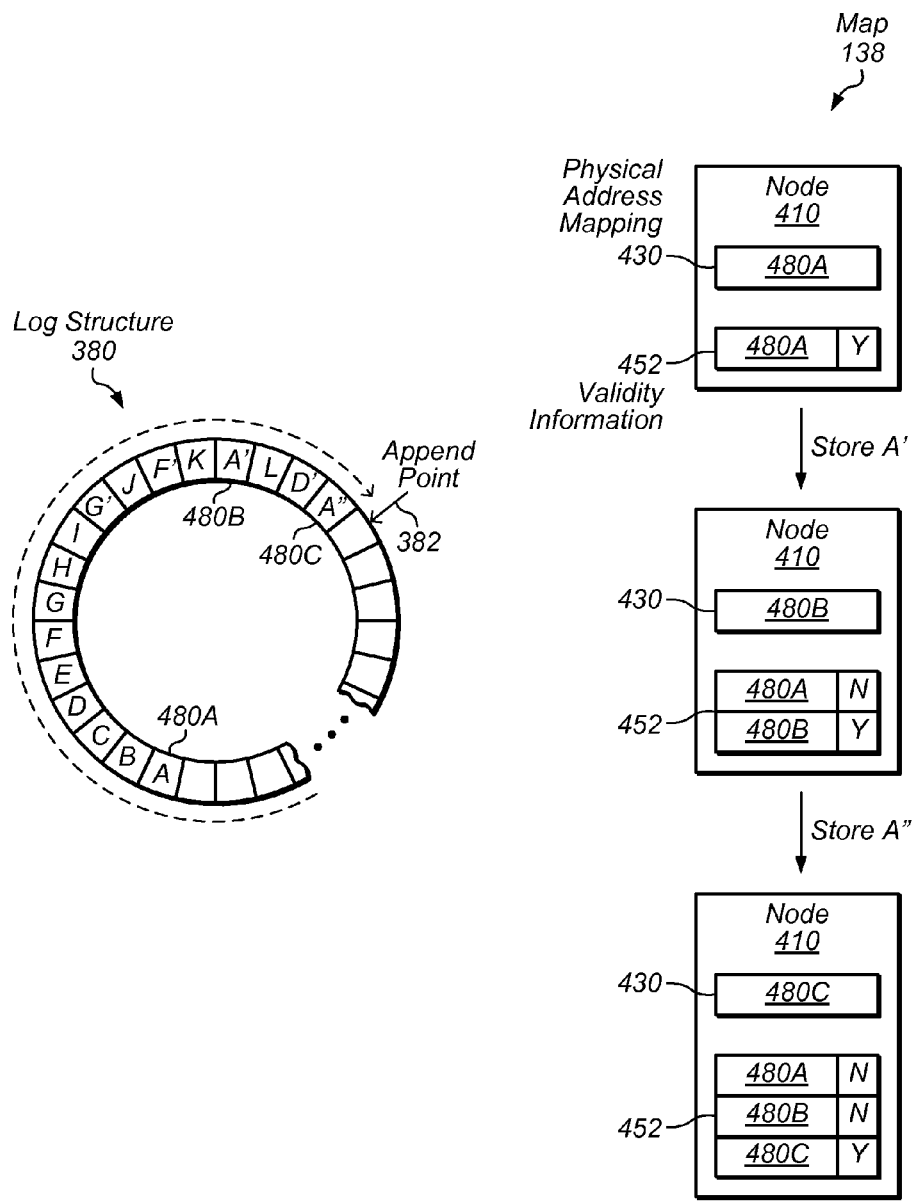
FIG. 4B depicts an exemplary usage of the map data structure.

Turning now to FIG. 4B, an exemplary usage of map 138 is depicted. In this example, the letters A-L represent various sets of data stored within log structure 380. When data A is initially written to storage device 130, it is stored at physical storage location 480A. To reflect this storage, a node 410 is added (or, in some instances, updated) in map 138. As shown, this node 410 may identify the physical address of location 480A and indicate that the data stored within that location is valid. When data A is subsequently updated (or merely moved), another instance of data A shown as A' is stored at a location 480B identified by the then current append point 382. A node 410 may then be updated (or, in some embodiments, another node 410 may be added) to reflect that the logical address for data A now maps to a physical address for location 480B; location 480A is then indicated as having invalid data. When data A is again written, another instance of data A shown as A" is stored at a location 480C. Again, a node 410 may be updated (or added) that identifies the physical address of location 480C as mapping to the logical address for data A; location 480B is also indicated as having invalid data. The previous (now invalid) instances A and A' may continue to reside in storage device 130 until the corresponding logical erase blocks 320 corresponding to locations 480A and 480B are erased (i.e., reclaimed).

Figure 5:
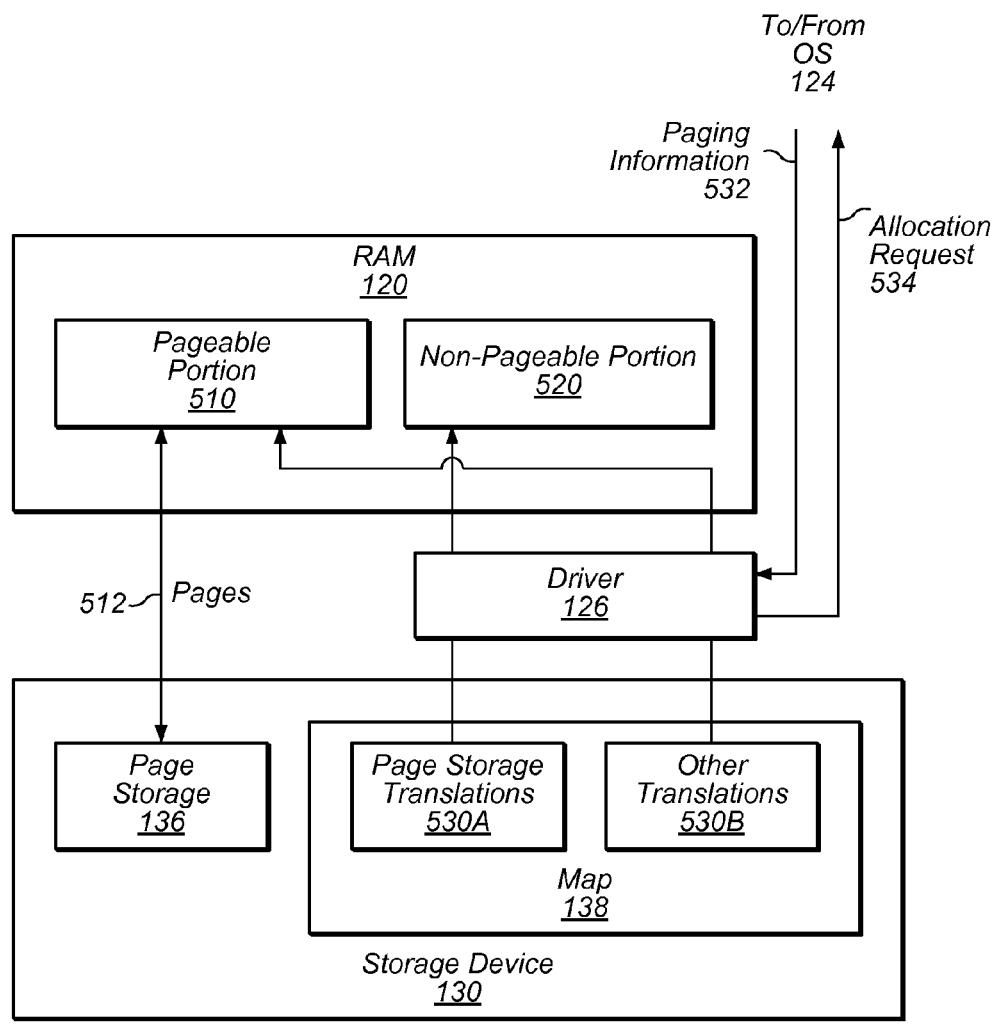
FIG. 5 is a block diagram illustrating one embodiment of storing translations from a map data structure.

Turning now to FIG. 5, a block diagram of one embodiment of storing translations from map 138 is depicted. As noted above, in some embodiments, driver 126 may preallocate portions of memory in order to store translations usable to access page storage 136. In the illustrated embodiment, driver 126 stores translations of map 138 within a page portion 510 and a non-pageable portion 520 of RAM 120. These translations may include both page storage translations 530A and other translations 530B of map 138.

Pageable portion 510, in one embodiment, is a portion of RAM 120 that includes pages 512 considered for eviction from RAM 120 by OS 124. As noted above, these pages 512 may be evicted in order make space available for storage of pages 512 being read from page storage 136. OS 124 may read pages 512 from page storage 136 in response to processor unit 110 asserting a page fault exception. In the illustrated embodiment, driver 126 stores other translations 530B (discussed below) in pageable portion 510. Accordingly, OS 124 may move these translations to and from page storage 136 as they are needed.

Non-pageable portion 520, in one embodiment, is a portion of RAM 120 that includes pages that are not considered for eviction from RAM 120 by OS 124. (That is, when a page needs to be evicted from RAM 120, OS 124 does not include any pages within non-pageable portion 520 as eviction candidates, which are instead taken from the pageable portion of RAM 120.) As noted above, in one embodiment, portion 520 may include pages identified as being associated with the working set of driver 126. In the illustrated embodiment, driver 126 stores page storage translations 530A in portion 520. Accordingly, in such an embodiment, OS 124 does not consider the pages storing these translations 530A for eviction to page storage 136.

Page storage translations 530A, in one embodiment, are translations that are usable to access page storage 136. That is, when driver 126 receives a request from OS 124 to access page storage 136, driver 126 may access one or more translations 530A to translate the logical addresses specified by the request to the physical addresses having the requested data. Accordingly, in one embodiment, translations 530A may include nodes 410 having logical address ranges 420 that have been identified by OS 124 (e.g., using information 532 described below) as corresponding to page storage 136.

Other translations 530B, in one embodiment, are translations that are usable to access data other than that of page storage 136—i.e., translations for logical addresses that fall outside of the address ranges associated with page storage 136. Such translations 530B may include translations for data of applications 122 and/or OS 124.

Paging information 532, in one embodiment, is information that is usable by driver 126 to reserve memory allocations and/or store translations 530 in RAM 120. In various embodiments, paging information 532 includes information usable to determine the size of a memory allocation to be requested. Accordingly, in some embodiments, this information may include the size of page storage 136 (or the maximum permissible size of page storage 136), which may be determined by accessing a registry of OS 124. For example, in one embodiment in which OS 124 is a WINDOWS OS, driver 126 may read the maximum permitted page file size specified in the WINDOWS registry as information 532. In another embodiment, in which OS 124 is a Linux OS, driver 126 may read the size of the swap. For example, in the case that a swap partition is being used, driver 126 may read the linux file /etc/fstab to determine the swap partition and then read a partition table to determine the size of the swap partition. Alternatively, in the case that a swap file is being used, driver 126 may read the size of the swap file. In some embodiments, paging information 532 may include the logical address ranges of page storage 136, which may be used by driver 126 to determine whether translations 530 are page storage translations 530A or other translations 530B. In other words, OS 124 may identify (e.g., at boot) the logical address ranges at which page storage 136 is to be stored. Driver 126 may then identify which translations in map 138 are page storage translations 530A and move those translations 530A into non-pageable portion 520. In some embodiments, driver 126 may also use the received logical address ranges to distinguish data requests that are directed to page storage 136 from data requests that are directed to other areas of storage device 130. In other words, driver 126 may identify a data request that specifies a logical address within an identified range as being a data request directed to page storage 136 (such as a data request to bring in a page or evict a page). Data requests to page storage 136 may be referred to as "paging IO," while data requests to areas for storage device 130 that are not to page storage 136 may be referred to as "non-paging 10."

Allocation requests 534, in one embodiment, are requests sent by driver 126 in order to reserve an allocation in non-pageable portion 520 for translations 530A. In some embodiments, requests 534 may include multiple types of requests. Accordingly, in some embodiments, driver 126 may send a first request for a memory allocation within RAM 120 and a second request identifying the memory allocation as being associated with a working set of driver 126. For example, in one embodiment, the first request is a call to the WINDOWS API function VirtualAlloc to allocate memory, and the second request is a call to the WINDOWS API function VirtualLock change the working set of driver 126. In other embodiments, a single request 534 may be sent, however. In some embodiment, OS 124 may also respond to a request with an acknowledgement that the request has been granted (or denied in some instances).

In various embodiments, requests 534 specify a desired allocation size. In one embodiment, this size is determined based on information 532 and is sufficient to store translations usable to translate the address range of page storage 136. In some embodiments, this size may be determined based on a maximum size of page storage 136 as permitted by OS 124 (which may be three times the size of RAM 120 in one instance). In basing the size of portion 520 on the size the maximum possible size of page storage 136, driver 126 can permit the size of page storage 136 to vary while still storing enough translations for storage 136.

In some embodiments, driver 126 submits an initial request 534 (or an initial set of requests 534) for storing translations 530A without issuing subsequent requests 534 for storing translations 530A. In one embodiment, this request 534 may be submitted during boot of computing system 100 as discussed above. More specifically, in one embodiment, this request 534 may be submitted during initialization of driver 126 during boot. In some embodiments, driver 126 may submit other memory allocations requests periodically (i.e., as needed) for other translations 530B. In some embodiments, driver 126 may maintain one or more counters indicative of a number of address translations 530 stored within RAM 120, portion 510, and/or portion 520. Driver 126 may then issue requests for additional allocations of memory to store address translations 530B based the values of the counters (e.g., in response to a value of a counter reaching a threshold value).

Figure 6:
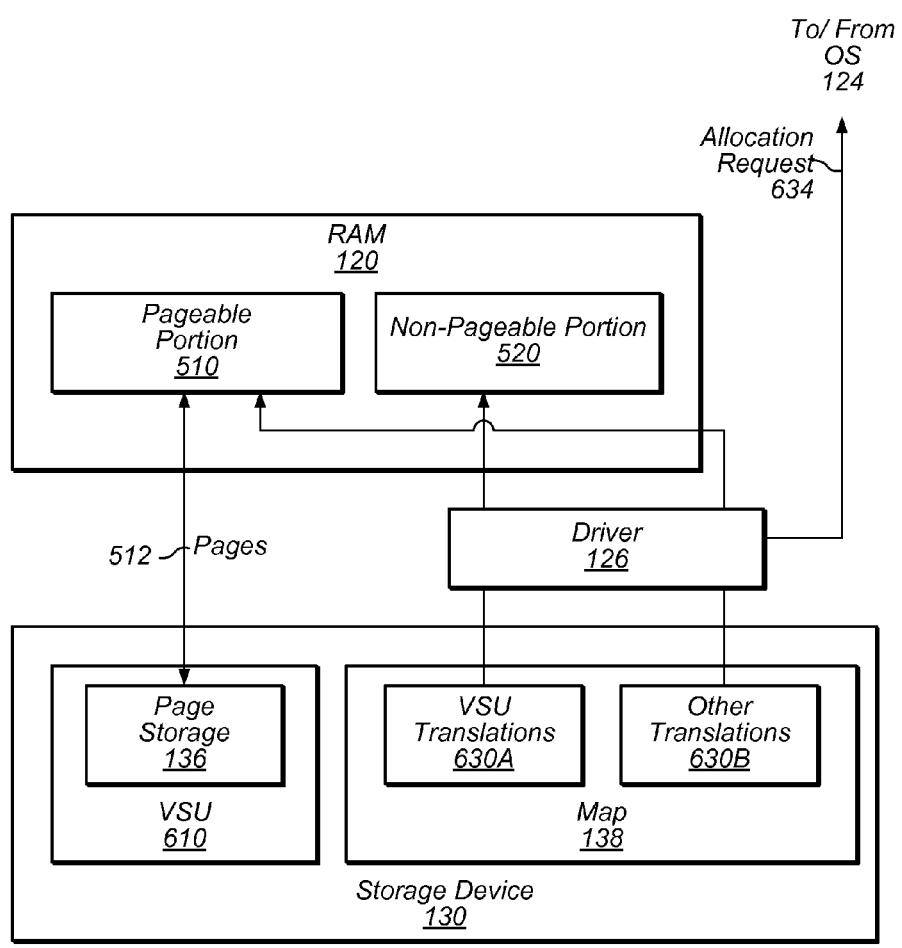
FIG. 6 is a block diagram illustrating another embodiment of storing translations from a map data structure.

Turning now to FIG. 6, a block diagram of another embodiment of storing translations from map 138 is depicted. As noted above, in some embodiments, page storage 136 may be stored within a virtual storage unit (VSU), and driver 126 may request one or more memory allocations that are sufficient to store translations for the address range (or address ranges) occupied by that VSU. Accordingly, in the illustrated embodiment, page storage 136 is located within VSU 610. Driver 126 also stores translations of map 138 that include VSU translations 630A and other translations 630B.

VSU 610, in one embodiment, includes a set of logical blocks storing pages of page storage 136. In various embodiments, VSU 610 has a capacity that is less than the capacity of storage device 130 (as noted above, storing translations for the entire physical address range of storage device 130 in RAM 120 may be impractical). In some embodiments, VSU 610 may include additional data such as data of applications 122 and/or OS 124. In some embodiments, VSU 610 may be one of multiple VSUs 310 in storage device 130. In one embodiment, VSU 610 may correspond to a boot partition of computing system 100 as discussed above.

VSU translations 630A, in one embodiment, are translations that are usable to access VSU 610 including page storage 136. Accordingly, in one embodiment, translations 530A may include nodes 410 having logical address ranges 420 that have been identified as corresponding to VSU 610. As shown, such translations 630A may be stored within a non-pageable portion 520 of RAM 120.

Other translations 630B, in one embodiment, are translations that are usable to access data other than that of VSU 610—i.e., translations for logical addresses that fall outside of the address ranges associated with VSU 610. As shown, such translations 630B may be stored within a pageable portion 510 of RAM 120.

Allocation requests 634, in one embodiment, are requests sent by driver 126 in order to reserve an allocation in non-pageable portion 520 for translations 630A. In some embodiments, requests 634 may be submitted in a similar manner as requests 534 described above; however, in some embodiments, driver 126 may send requests 634 without receiving metadata from OS 124 such as paging information 532. Accordingly, in various embodiments, driver 126 may determine the size of VSU 610 and/or the logical address range corresponding to VSU 610 by accessing metadata within storage device 130. In some embodiments, driver 126 may also maintain such metadata independent of managing cache 128. In one embodiment, driver 126 uses this information to determine the size of allocation that would be able to store translations 630A and specifies this determined size in a request 634. In one embodiment, driver 126 submits an initial request 634 (or initial set of requests 534) for storing translations 630A without issuing subsequent requests 634 for storing translations 630A (e.g., during boot). Driver 126 may also issue requests for additional allocations of memory to store address translations 630B (such as discussed above with respect to translations 530B).

Figure 7:
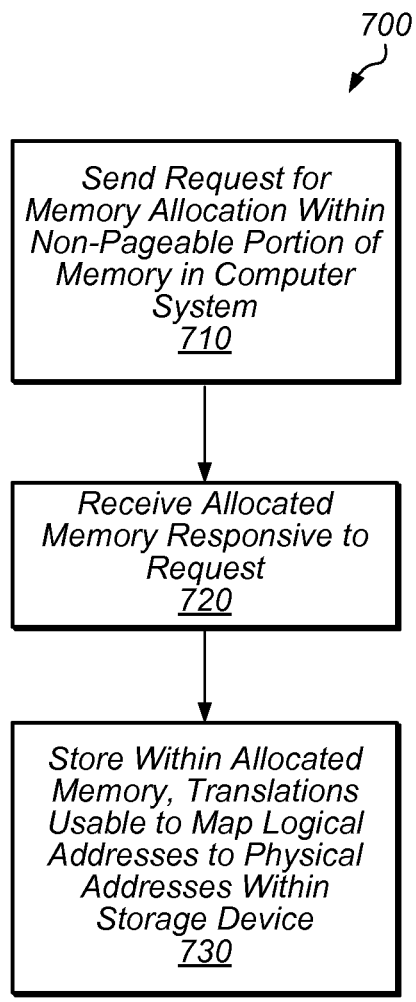
FIG. 7 is a flow diagram illustrating one embodiment of a method.

Turning now to FIG. 7, a flow diagram of a method 700 is depicted. Method 700 is one embodiment of a method that may be performed by an apparatus such as computing system 100 or storage device 130. Accordingly, in one embodiment, the apparatus may execute program instructions of a driver such as driver 126 to perform method 700. In some embodiments, performance of method 700 may allow the number of translations stored in memory to be reduced.

In step 710, a request is sent for a memory allocation within a non-pageable portion (e.g., non-pageable portion 520) of a memory (e.g., RAM 120) in a computer system. In some embodiments, the allocated memory has a size sufficient to store translations usable to translate all addresses within the swap portion (e.g., page storage 136). In one embodiment, step 710 includes accessing a registry of the operating system to determine the size of the swap portion. In some embodiments, a driver (e.g., driver 126) has a set of non-evictable pages allocated by the computer system such that the non-pageable portion of the memory corresponds to the set of non-evictable pages of the driver.

In step 720, allocated memory is received responsive to the request. In various embodiments, the memory may be allocated by an operating system executing on the computer system such as an allocation to a driver.

In step 730, translations (e.g., nodes 410) usable to map logical addresses to physical addresses within a storage device (e.g., device 130) are stored within the allocated memory (e.g., within non-pageable portion 520). In various embodiments, the stored translations are usable to access a swap portion of the storage device. In some embodiments, the storage device includes a virtual storage unit (e.g., VSU 610) that includes a swap portion of the storage device. In such an embodiment, the stored translations are usable to translate addresses of an address range associated with the virtual storage unit (e.g., VSU translations 630A). In various embodiments, step 730 may also include storing, in a pageable portion of the memory (e.g., pageable portion 510), one or more translations usable to translate addresses of an address range that is not associated with the virtual storage unit (e.g., other translations 630B). In various embodiments, step 730 may further include updating ones of translations as data is moved on the storage device (such as updating nodes 410 as discussed above with respect to FIG. 4B). In some embodiments, step 730 may include determining, for a virtual memory manager, an indication of logical addresses associated with the swap portion, and in response to receiving a data request specifying a logical address identified in the indication, identifying the data request as being a request to access the swap portion (i.e., that the request is paging 10 as discussed above). In various embodiments, step 730 includes using a translation (e.g., a translation 530A) stored the non-pageable portion to service a data request specifying a logical address associated with the swap portion, and using a translation (e.g., a translation 530B) stored in a pageable portion of the memory to service a data request specifying a logical address that is not associated with the swap portion.

Figure 8:
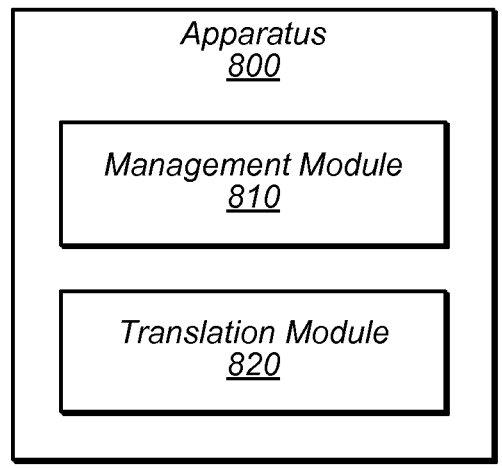
FIG. 8 is a block diagram illustrating one embodiment of an apparatus having a management module and a translation module.

Turning now to FIG. 8, a block diagram of an apparatus 800 including modules is depicted. As used herein, the term "module" refers to circuitry configured to perform operations or a memory having program instructions stored therein that are executable by one or more processors to perform operations. Accordingly, a module may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations. Apparatus 800 may include modules to implement any of the functionality described herein. For example, in the illustrated embodiment, apparatus 800 includes a management module 810 and translation module 820.

Management module 810, in one embodiment, is configured to cause address translations of a map data structure to be stored within a dedicated portion of memory. In one embodiment, the dedicated portion is used to store address translations that are usable to access a set of storage locations (e.g., of page storage 136) within a storage device used to store pages evicted from the memory. In some embodiments, management module 810 is configured to determine a size of the dedicated portion of memory such that address translations for addressing each page of a swap file for evicted pages are storeable within the dedicated portion at a single point in time, and to reserve the dedicated portion. In some embodiments, the storage device is configured to store a plurality of partitions (e.g., VSUs 310), one of the plurality of partitions stores the set of storage locations (e.g., VSU 610), and the address translations are usable to translate an address range of the partition. In one embodiment, the partition is a boot partition of the computer system. In one embodiment, the management module is configured to maintain a counter of a number of the address translations stored within the dedicated portion, and to request, based on a value of the counter, an allocation of memory to store additional address translations (e.g., other translations 530 and/or 630).

Translation module 820, in one embodiment, is configured to use one or more of the stored address translations to facilitate accesses to the set of storage locations. In various embodiments, accesses to the set of storage locations may be performed to read pages in order to service pages faults as well as to evict pages being paged out.

In some embodiments, management module 810 and translation module 820 are within a controller such as controller 132. In another embodiment, modules 810 and 820 may be located within a memory such as memory 120. In sum, the modules of apparatus 800 may be implemented in any suitable manner to perform functionality described herein. Apparatus 800 may also correspond to any suitable structure having the functionality of modules 810 and 820. In one embodiment, apparatus 800 is a computing system that includes (or is coupled to) a storage such as storage device 130. In another embodiment, apparatus 800 is a card including a controller (such as controller 132) and one or more storage elements (such as storage banks 134). In yet another embodiment, apparatus 800 is a computing system including a memory system that stores modules 810 and 820.

Figure 9A:
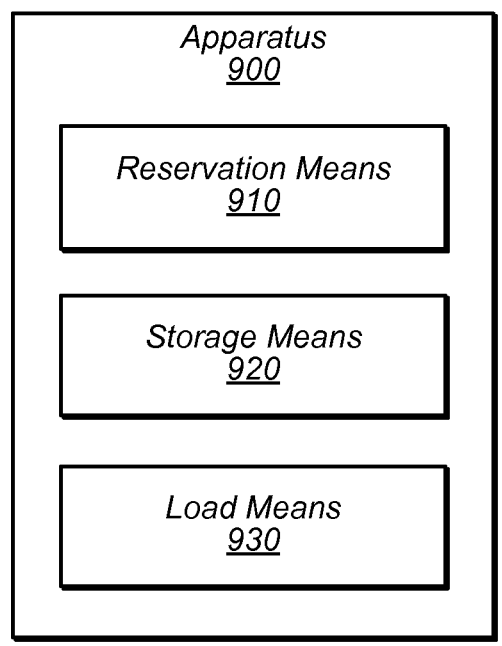
FIG. 9A is a block diagram illustrating another embodiment of an apparatus having a reservation means and load means.

Turning now to FIG. 9A, a block diagram of an apparatus 900 including a reservation means 910, storage means 920, and a load means 930 is depicted. Apparatus 900 may correspond to any suitable structure having the functionality of reservation means 910, storage means 920, and load means 930. For example, apparatus 900 may be any suitable type of computing device such as a server, laptop, desktop, a mobile device, etc. In some embodiments, apparatus 900 may include multiple computing devices working together. In some embodiments, apparatus 900 is a card including a controller (such as controller 132) and one or more storage elements (such as storage banks 134.

In various embodiments, reservation means 910 may implement any of the functionality described herein with respect to driver 126. Accordingly, in one embodiment, reservation means 910 is for requesting an allocation of a non-evictable portion of a memory within a computer system. In some embodiments, reservation means 910 is configured to determine a size of the memory allocation to be requested based on a size of a portion of the storage device used to store evicted pages. In some embodiments, reservation means 910 is configured to determine a size of the memory allocation to be requested based on a size of a partition used to store evicted pages. In some embodiments, reservation means 910 may also implement functionality other than that described in conjunction with driver 126. For example, in some embodiments, reservation means 910 may implement functionality described with respect to an application 122.

Reservation means 910 may correspond to any suitable structure. In one embodiment, reservation means 910 is a hardware circuit configured to perform operations (e.g., controller 132). The hardware circuit may include, for example, custom very-large-scale integration (VLSI) circuits or gate arrays, off-the-shelf semiconductors such as logic chips, transistors, or other discrete components. Means 910 may also be implemented in programmable hardware devices such as field programmable gate arrays, programmable array logic, programmable logic devices, or the like. In another embodiment, reservation means 910 includes a memory having program instructions stored therein (e.g., RAM 120) that are executable by one or more processors (e.g., processor unit 110) to implement an algorithm. In one embodiment, reservation means 910 implements the algorithm discussed with respect to FIG. 9B. In some embodiments, reservation means 910 corresponds to management module 810 and/or translation module 820. Accordingly, the phrase "means for requesting an allocation of a non-evictable portion of a memory within a computer system" refers to any of the structures listed above as well as their corresponding equivalents.

In various embodiments, storage means 920 may implement any of the functionality described herein with storage device 130. Accordingly, in one embodiment, storage means 920 is for storing data using a log-structure. Storage means 920 may correspond to any suitable structure such as those discussed above with respect to storage device 130. Accordingly, the phrase "means for storing data using a log-structure" refers to any of the structures listed above as well as their corresponding equivalents.

In various embodiments, load means 930 may implement any of the functionality described herein with respect to driver 126. Accordingly, in one embodiment, load means 920 is for loading, into the allocation of the non-evictable portion of memory, translations for accessing pages evicted from the memory to storage means 920. In some embodiments, load means 930 may implement functionality other than that described with respect to driver 126. Load means 930 may correspond to any suitable structure such as those discussed above with respect to reservation means 910. In one embodiment, load means 930 implements the algorithm discussed with respect to FIG. 9C. Accordingly, the phrase "means for loading, into the allocation of the non-evictable portion of memory, translations for accessing pages evicted from the memory" refers to any of the structures listed above as well as their corresponding equivalents.

Figure 9B:
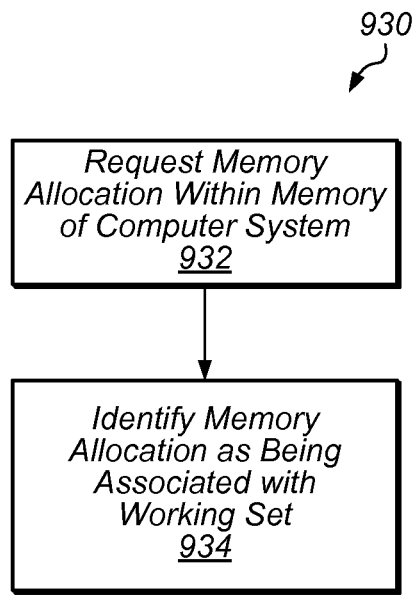
FIG. 9B is a flow diagram illustrating one embodiment of an algorithm implemented by a reservation means.

Turning now to FIG. 9B, a flow diagram illustrating an algorithm 930 is depicted. Algorithm 930 is one embodiment of an algorithm implemented by reservation means 910. In the illustrated embodiment, algorithm 930 includes, at step 932, requesting a memory allocation within a memory of a computer system. In some embodiments, step 932 includes determining, for a virtual memory manager (e.g., OS 124, hypervisor, etc.), information that is usable to determine a memory allocation size. In some embodiments, the requesting includes issuing a request to an operating system for a memory allocation having the determined size. Algorithm 930 further includes, at step 934, identifying the memory allocation as being associated with a working set. In some embodiments, step 934 may include issuing a call to an operating system to identify the memory allocation as being associated with the working set of a driver such as driver 126.

Figure 9C:
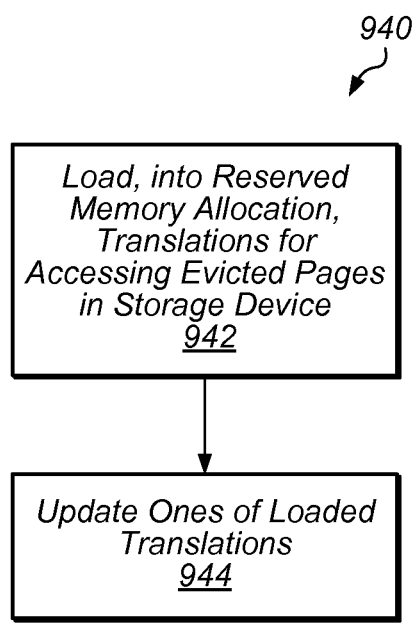
FIG. 9C is a flow diagram illustrating one embodiment of an algorithm implemented by a load means.

Turning now to FIG. 9C, a flow diagram of an algorithm 940 is depicted. Algorithm 940 is one embodiment of an algorithm implemented by load means 920. In the illustrated embodiment, algorithm 940 includes, at step 942, loading, into the reserved memory allocation, translations for accessing evicted pages in a storage device. Algorithm 940 further includes, at step 944, updating ones of the loaded translations. In some embodiments, ones of the loaded translations may be updated as the portion that stores evicted pages is moved elsewhere in the storage device.

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system (e.g., one or more of the steps may be deleted, modified, or combined with other steps). Therefore, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Additionally, as will be appreciated by one of ordinary skill in the art, principles of the present disclosure may be reflected in a computer program product on a machine-readable storage medium having machine-readable program code means embodied in the storage medium. Any tangible, non-transitory machine-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a machine-readable memory that can direct a computer or other programmable data processing apparatus to function in a particular manner, such that the instructions stored in the machine-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components that are particularly adapted for a specific environment and operating requirements may be used without departing from the principles and scope of this disclosure. These and other changes or modifications are intended to be included within the scope of the present disclosure.

What is claimed is:

1. A method, comprising:
    associating logical addresses of a logical address space with physical addresses of a storage device by use of a translation map;
    identifying logical address translations of the translation map pertaining to swap storage of a memory managed by an operating system, the swap storage to store data evicted from a pageable portion of the memory by the operating system, including user data evicted from one or more pages of the memory; and
    storing the identified logical address translations within a non-pageable portion of the memory not subject to eviction from the memory to the swap storage, wherein the identified logical address translations include translations pertaining to the user data evicted from the one or more pages of the memory, and wherein logical address translations of the translation map other than the identified logical address translations are stored in the pageable portion of the memory subject to eviction to the swap storage.

2. The method of claim 1, further comprising:
    determining that a data request pertains to the swap storage in response to determining that the data request pertains to one or more of the identified logical address translations.

3. The method of claim 1, wherein identifying the logical address translations of the translation map pertaining to the swap storage comprises accessing a registry of the operating system to determine a size of the swap storage.

4. The method of claim 1, further comprising allocating the non-pageable portion of the memory, such that a size of the allocation of the non-pageable portion of the memory corresponds to a size of the swap storage.

5. The method of claim 1, wherein the swap storage comprises a virtual storage unit of the storage device, and wherein the identified logical address translations are usable to translate logical addresses of the virtual storage unit to physical storage locations on the storage device, the method further comprising storing logical address translations not associated with the virtual storage unit in the pageable portion of the memory.

6. The method of claim 1, further comprising storing data on the storage device in response to respective write requests, wherein storing data on the storage device in response to a request to write a data segment corresponding to a particular logical address comprises,
    appending a data packet to a storage log on the storage device, the data packet comprising the data segment and persistent metadata indicating the particular logical address, wherein appending the data packet comprises storing the data packet at an append point of the storage log,
    recording a logical address translation for the particular logical address in the translation map, wherein the translation is recorded in the non-pageable portion of the memory in response to the particular logical address corresponding to the swap storage, and wherein the translation is recorded in the pageable portion of the memory responsive to the particular logical address not corresponding to the swap storage.

7. The method of claim 1, further comprising using a logical address translation stored in the non-pageable portion of the memory to determine a physical storage address for a data request pertaining to the swap storage.

8. The method of claim 1, wherein the method is performed by a storage driver configured to manage storage operations on the storage device, and wherein the non-pageable portion of the memory comprises a set of non-pageable memory pages allocated to the driver by the operating system.

9. The method of claim 1, wherein the storage device includes a solid-state storage array, and wherein the memory comprises volatile memory.

10. An apparatus, comprising:
    a storage controller configured to store data on a non-volatile storage medium; and
    a storage driver configured to map logical addresses corresponding to the data stored on the non-volatile storage medium to physical addresses of the stored data on the non-volatile storage medium using storage translations,
    wherein the storage driver is configured to identify logical addresses corresponding to paging storage for a memory managed by an operating system, the paging storage to store data evicted from the memory on the non-volatile storage medium, the evicted data comprising user data and one or more of the storage translations,
    wherein the storage driver is further configured to maintain storage translations of the identified logical addresses within pages of the memory that are not subject to eviction from the memory by the operating system.

11. The apparatus of claim 10, wherein the storage driver is configured to reserve the pages of the memory that are not subject to eviction from the memory for storage translations pertaining to the paging storage on the non-volatile storage medium.

12. The apparatus of claim 10, wherein the non-volatile storage medium comprises a plurality of partitions, wherein one of the plurality of partitions is configured for use as the paging storage, and wherein the identified logical addresses correspond to the partition.

13. The apparatus of claim 12, wherein the partition is a boot partition of a computer system.

14. The apparatus of claim 10, wherein the storage driver is configured to:
maintain a counter of a number of storage translations; and
based on a value of the counter, request an allocation of memory for additional storage translations.

15. The apparatus of claim 10, wherein the storage controller comprises a controller circuit of a storage device comprising the non-volatile storage medium.

16. A non-transitory computer readable medium having program instructions stored thereon, wherein the program instructions are executable by a processor to perform operations, comprising:
maintaining logical-to-physical translations pertaining to a persistent storage medium, the translations to associate logical addresses of a logical address space with storage locations of data corresponding to the logical addresses stored on the persistent storage medium;
selecting logical-to-physical translations that are usable to access swap space on the persistent storage medium, the swap space usable by a virtual memory manager to store data evicted from evictable pages of a memory by the virtual memory manager, the data evicted to the swap space by the virtual memory manager comprising user data; and
loading the selected translations into designated non-evictable pages of the memory, wherein the designated non-evictable pages of the memory are not to be evicted from the memory to the swap space on the persistent storage medium by the virtual memory manager, the selected translations comprising translations pertaining to user data evicted to the swap space on the persistent storage medium by the virtual memory manager.

17. The computer readable medium of claim 16, wherein the operations further comprise determining that a data request pertains to the swap space in response to determining that the data request pertains to one or more of the selected translations.

18. The computer readable medium of claim 16, wherein selecting the logical-to-physical translations that are usable to access the swap space comprises selecting logical-to-physical translations that correspond to a virtual storage unit comprising an operating system.

19. The computer readable medium of claim 16, wherein the operations further comprise requesting a memory allocation to store the selected translations within the non-evictable pages of the memory during a boot process of a computer system.

20. The computer readable medium of claim 16, wherein the selected translations comprise a subset of the logical-to-physical translations pertaining to the persistent storage medium.

21. The computer readable medium of claim 16, wherein the operations further comprise updating one or more of the selected translations in response to relocation of data evicted to the swap space by the virtual memory manager on the persistent storage medium.

22. The computer readable medium of claim 16, wherein loading the selected translations further comprises associating the designated non-evictable pages of the memory with a working set of an application.

23. An apparatus, comprising:
means for storing data within a log-structure on a storage medium and for associating the data stored within the log-structure on the storage medium with respective logical identifiers by use of a translation map;
means for identifying entries of the translation map corresponding to page storage of a memory manager, the page storage to store pages evicted from the memory by the memory manager on the storage medium, the evicted pages comprising user data evicted from the memory by the memory manager; and
means for storing the identified entries of the translation map within a non-evictable portion of the memory, the non-evictable portion of the memory not subject to eviction to the page storage on the storage medium, the identified entries including entries pertaining to the user data evicted from the memory to the page storage by the memory manager.

24. The apparatus of claim 23, wherein the storage medium comprises a solid-state storage array.

* * * * *